United States Patent [19]

Nishimura

[11] Patent Number: 6,023,598
[45] Date of Patent: Feb. 8, 2000

[54] COPIER WITH AN AUTOMATIC DOCUMENT FEEDER

[75] Inventor: Michiaki Nishimura, Nara, Japan

[73] Assignee: Sharp Kabushiki Kaisha, Osaka, Japan

[21] Appl. No.: 09/229,837

[22] Filed: Jan. 13, 1999

[30] Foreign Application Priority Data

Jan. 29, 1998 [JP] Japan .................................. 10-017007

[51] Int. Cl.⁷ ............................................... G03G 15/30
[52] U.S. Cl. .......................................... 399/203; 399/367
[58] Field of Search ................................. 399/177, 203, 399/206, 208, 215, 365, 367

[56] References Cited

U.S. PATENT DOCUMENTS

| 4,318,609 | 3/1982 | Knechtel et al. | 399/203 |
| 4,771,317 | 9/1988 | Katoh et al. | 399/203 |
| 4,866,484 | 9/1989 | Murai | 399/203 |
| 4,933,722 | 6/1990 | Fujiwara | 399/203 |
| 4,937,623 | 6/1990 | Nishimori et al. | 399/203 |
| 5,029,315 | 7/1991 | Morikawa et al. | 399/203 |
| 5,634,187 | 5/1997 | Ross | 399/365 |
| 5,812,912 | 9/1998 | Hiroi et al. | 399/203 |

FOREIGN PATENT DOCUMENTS

| 6-067309 | 3/1994 | Japan . |
| 7-199740 | 8/1995 | Japan . |

Primary Examiner—Sandra Brase
Attorney, Agent, or Firm—Renner, Otto, Boiselle & Sklar

[57] ABSTRACT

An automatic document feeder for a copier has the position for reading the image of an original fed by the automatic document feeder disposed near the rear edge of the original table of the copier. In this automatic document feeder, essential parts such as a pickup roller, etc., for feeding originals to the reading position of the original table are arranged concentratedly on the rear side of the copier. Therefore, the center of gravity of the automatic document feeder resides near the rear side of the copier. This automatic document feeder is hinged at the rear side of the copier so as to cover the top surface of the original table in an openable and closable manner. Accordingly, the automatic document feeder is opened and closed with respect to the top of the copier, at a pivot which resides on the rear side near the center of gravity thereof.

5 Claims, 14 Drawing Sheets

Image captured state in the manual copy mode

Copy image in the manual copy mode

Image captured state in the automatic copy mode

Copy image in the automatic copy mode

FIG. 7

| Address | Image data |
|---------|------------|
| α       | A1000      |
| α+1     | A999       |
| ⋮       | ⋮          |
| α+998   | A2         |
| α+999   | A1         |

FIG. 8

| No.1 No.2 No.3 — — — No.999 No.1000 | — 38a

| No.1000 No.999 — — — No.3 No.2 No.1 | — 38b

Copy image in the manual copy mode

Supplied data stream (A1, A2, ···, A1000)

Copy image in the automatic copy mode

Supplied data stream (A1000, ···, A2, A1)

COPIER WITH AN AUTOMATIC DOCUMENT FEEDER

BACKGROUND OF THE INVENTION

(1) Field of the Invention

The present invention relates to a copier which has an automatic document feeder laid over the top of the original table thereof in an openable and closable manner and can selectively implement either the manual copy mode in which the image of an original manually set on the original table is copied or the automatic copy mode in which the images of originals automatically fed by the automatic document feeder are copied.

(2) Description of the Related Art

There have been copiers which can selectively implement either the manual copy mode in which the image of an original manually set on the original table is copied or the automatic copy mode in which the images of originals automatically fed by the automatic document feeder are copied. A copier of this kind, as shown in FIG. 1, scans the image of the original set on an original table 138 in the manual copy mode by moving a mirror base 112 of an optical system unit 102 along the undersurface of original table 138 that is disposed on the top of a copier body 100, in the direction in parallel with the print sheet conveying direction inside copier body 100, while in the automatic copy mode it reads the images of originals fed by an automatic document feeder 109 mounted on the top of copier body 100, with mirror base 112 set stationarily at its home position which is detected by a home-position sensor 140.

Specifically, a glass slit 139 is arranged on the top face of copier body 100 at the position corresponding to the home position of mirror base 112. When, in the automatic copy mode, an original is fed within automatic document feeder 109, the image is sequentially read at the portion corresponding to glass slit 139 by optical system unit 102. More detailedly, in the automatic copy mode, mirror base 112 is set stationarily at the home position in copier body 100, then the original set on a document stacker 118 in automatic document feeder 109 is conveyed by the rotations of a pickup roller 113 and a feed roller 114 to a position where the leading edge abuts a resist roller 115. This resist roller 115 starts rotating at a predetermined timing, so that the original is introduced to the position opposing glass slit 139. The original having passed through the position opposing glass slit 139 is then discharged by the rotation of a discharge roller 116 to a document discharge tray 117.

In this way, in the copier in which manual and automatic copy modes can be selectively effected, the scanner unit for reading the image of an original set on the original table in the manual copy mode is also used to read the images of originals fed by automatic document feeder in the automatic copy mode. Therefore, the automatic document feeder is mounted on the top of the copier body where the original table is located, typically in such a manner that it can be opened and closed with respect to the top surface of the original table so as to allow for the manual placement of an original over the original table in the manual copy mode. Further, in order to allow the operator to set an original on and remove it from the original table from the front side of the copier body in the manual copy mode, the automatic document feeder is hinged at the rear side so that it can be opened and closed.

However, in general, in conventional copiers, the document feeding direction in automatic document feeder 109 and the direction of the movement of mirror base 112 of the scanner unit in copier body 100 are configured so as to be perpendicular to the front-to-rear direction of the copier body while, in the automatic copy mode, the scanner unit is configured so as to be set stationarily at the home position at the one side of the moving range. As a result, the essential parts such as pickup roller 113, feed roller 114, etc. in the automatic document feeder are arranged concentratedly on one side with respect to the direction perpendicular to the front-to-rear direction of the copier body. Resultantly, a weight imbalance occurs in the direction perpendicular to the opening and closing direction during opening and closing automatic document feeder 109, making it difficult to smoothly open and close it.

When the original feeding direction of automatic document feeder 109 as well as the direction of the movement of mirror base 112 of the scanner unit inside copier body 100 is configured so as to be along the front to rear direction of copier body 100, the reference position in original table 138 will be laid out on the front side of copier body 100 when the ease of setting originals is considered. Therefore, if a conventional automatic document feeder 109 is used without any modification, the center of gravity of automatic document feeder 109 having heavy load on the reference position side of original table 138 will inevitably reside on the front side of copier body 100 where the opening of automatic document feeder 109 is performed, which degrades the operativity when automatic document feeder 109 is opened and closed.

Further, since reading of the image of an original on original table 138 in the manual copy mode is effected from the home-position side of mirror base 112 in the scanner unit, a stopper is provided for original table 138 on the home-position side of mirror base 112 in order to regulate the position of setting the original to the reference position. Therefore, it is impossible to perform reading the original in the automatic copy mode using this area, so the conventional copier needs to have glass slit 139 which is dedicated to the automatic copy mode, resulting in increase in size and cost of the apparatus.

SUMMARY OF THE INVENTION

It is therefore an object of the present invention to provide a copier with an automatic document feeder wherein reading of the original image in the automatic copy mode is performed not on the reference position side of the original table but on the hinge side of the automatic document feeder so that the weight load in the automatic document feeder is concatenated on the hinge side to allow for a smooth opening and closing operation of the automatic document feeder without losing ease of handling documents in the manual copy mode and wherein the number of parts and hence the size and cost of the apparatus can be reduced by eliminating the necessity of the glass slit dedicated to the automatic copy mode.

In order to achieve the above object, the present invention is configured as follows:

In accordance with the first aspect of the invention, a copier with an automatic document feeder, comprises:

an original table;

an automatic document feeder hinged at the rear side of the original table so as to cover the top surface of the original table in an openable and closable manner; and a scanner portion which, in the manual copy mode in which the image of an original manually set on the original table is copied, is set at a reference position from which the scanner portion starts moving, near the front edge of the original table, and is set stationarily at a reading position near the rear edge of the original table in the automatic copy mode in which the image of an original fed by the automatic document feeder is copied.

In accordance with the above first aspect of the invention, the reading position where the essential parts in the automatic document feeder are arranged concentratedly is laid out near the rear edge of the original table while the automatic document feeder is mounted at a hinge near the rear edge so as to cover the top surface of the original table in an openable and closable manner. This configuration allows for smooth opening and closing of the automatic document feeder about the hinge on the rear side which is in proximity to the center of gravity thereof.

Further, the reference position to which the set original is positioned is disposed near the front edge of the original table while the reading position for reading the image of the original in the automatic copy mode is disposed near the rear edge of the original table. Therefore, since the member for providing the reference position will not interfere with reading of the original image even when the reading position is provided within the original table, it is no longer necessary to provide any glass slit or the like for providing a reading position, separately from the original table.

In accordance with the second aspect of the invention, the copier with an automatic document feeder having the above first aspect further comprises a copy image normalizing means which makes the copy image in the manual copy mode correspond to the copy image in the automatic copy mode.

In accordance with the above second aspect of the invention, the copy image obtained in the automatic copy mode and that in the manual copy mode are made to agree with each other. Therefore, the copy image in one of the manual and automatic copy modes will not be reproduced as a reversal of the image in the other mode. Accordingly, it is possible to provide a pertinent copy image at any mode.

In accordance with the third aspect of the invention, the copier with an automatic document feeder having the above second aspect is characterized in that the copy image normalizing means is configured so that the direction of the relative movement of the original image face to the scanner portion in the manual copy mode is made correspondent to the direction of the relative movement of the original image face to the scanner portion in the automatic copy mode.

In accordance with the above third aspect of the invention, the movement of the image of the original relative to the scanner portion in the manual copy mode in which the scanner portion moves relative to the original set on the original table is made agree with that in the automatic copy mode in which the original is moved relative to the scanner portion which is set stationarily at the reading position. Thus, the image data captured by the scanner portion in one of the manual and automatic copy modes will agree with that in the other mode without needing inversion of the read image data.

In accordance with the fourth aspect of the invention, the copier with an automatic document feeder having the above first aspect, further comprises:

a front-side correction member used for an image correcting process in the manual copy mode, disposed near the front edge of the original table; and a rear-side correction member used for an image correcting process in the automatic copy mode, disposed near the rear edge of the original table.

In accordance with the above fourth aspect of the invention, in the manual copy mode in which the scanner portion starts to move from the proximity to the front edge of the original table, the front-side correction member provided near the front edge of the original table is used to perform image correction while in the automatic copy mode in which the scanner portion is set stationarily in the proximity to the rear edge of the original table, the rear-side correction member provided near the rear edge of the original table is used to perform image correction. This configuration shortens the moving distance of the scanner portion during a copy operation including image correction and hence reduces the time required for a copy operation and improves the operational efficiency of the copier.

In accordance with the fifth aspect of the invention, the copier with an automatic document feeder having the above fourth aspect is characterized in that the image correcting process is performed using the rear-side correction member during preparation of the automatic copy mode, in which the scanner portion moves from a home position disposed near the front edge of the original table to the reading position disposed near the rear edge of the original table.

In accordance with the above fifth aspect of the invention, upon the start of a copy operation in the automatic copy mode, image correction is performed using the rear-side correction member during preparation of the automatic copy mode, in which the scanner portion moves from the home position disposed near the front edge of the original table to the reading position disposed near the rear edge of the original table. Therefore, image correction to be done before the start of the copying operation can be performed during movement of the scanner portion, thus making it possible to reduce the time required for the copying operation.

BRIEF DESCRIPTION OF THE DRAWINGS

FIG. 7 is a diagram showing the storage content in the memory of the image processor of a copier having an automatic document feeder in accordance with the first embodiment, related to the second aspect of the invention;

FIG. 8 is a diagram showing the configuration of CCD sensors in the scanner unit of a copier having an automatic document feeder in accordance with the second embodiment, related to the second aspect of the invention;

DESCRIPTION OF THE PREFERRED EMBODIMENTS

Figure 1:
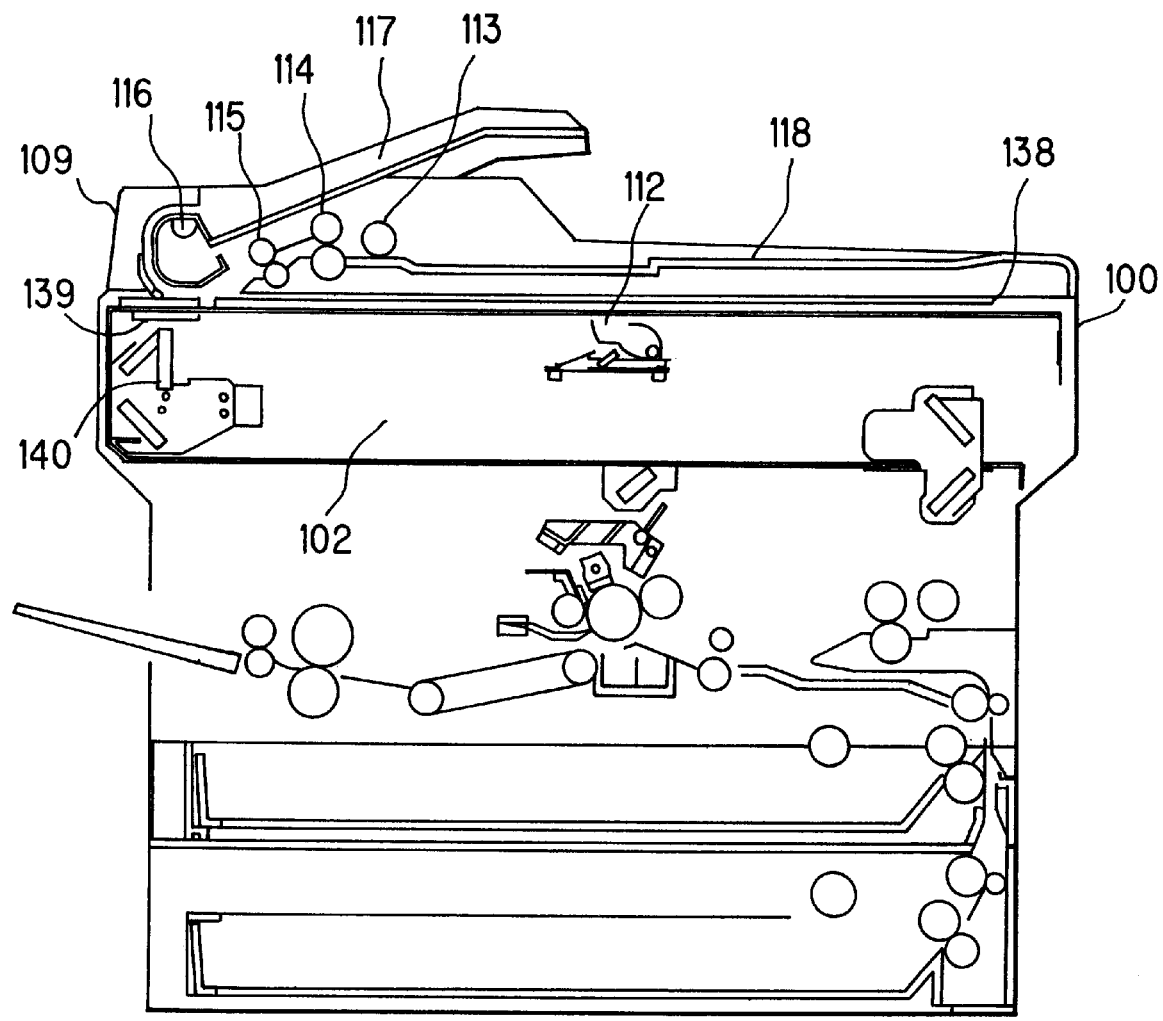
FIG. 1 is a schematic front sectional view showing the configuration of a copier having a conventional automatic document feeder.
Figure 2:
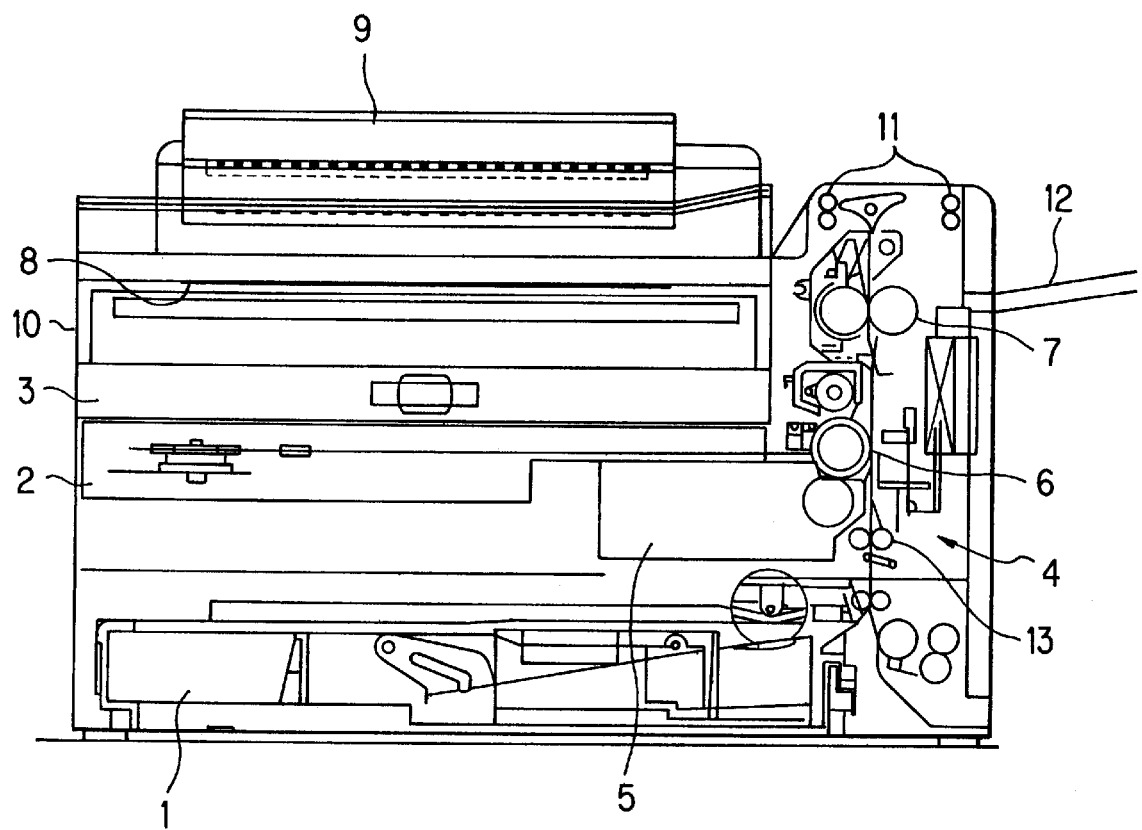
FIG. 2 is a schematic front sectional view showing the configuration of a copier having an automatic document feeder in accordance with the embodiment of the invention.

FIG. 2 is a schematic front sectional view showing the configuration of a copier having an automatic document feeder in accordance with the embodiment of the present invention. Inside a copier 10, a scanner unit 3 and a laser writing unit 2 are arranged in the upper and middle portions, respectively while a paper feeder cassette 1 is mounted at the bottom. Provided on the right side (in the drawing) inside copier 10 is a copy processing portion 4 having a photosensitive member drum 6, a developing unit 5 and a fixing unit 7. Further, the upper position of copier 10 is provided with an automatic document feeder 9 so as to cover the top of an original table 8 in openable and closable manner.

In this copier 10, scanner unit 3 reads the image of an original manually set on original table 8 in the manual copy mode or the image of an original fed by automatic document feeder 9 in the automatic copy mode and supplies the image data captured by scanner unit 3 to laser writing unit 2. Laser writing unit 2 irradiates photosensitive member drum 6 with a laser beam in accordance with the image data. The surface of photosensitive member drum 6 has been electrified uniformly with charge of a single polarity before the irradiation by the laser beam so that a static latent image is formed on the surface of photosensitive member drum 6 by the photoconductive effect produced by irradiation by the laser beam.

The developer is supplied from developing unit 5 to the surface of photoreceptive drum 6 having been illuminated by the laser beam so that the static latent image is visualized into an image with the developer. In parallel, a copy sheet fed from paper feeder cassette 1 is synchronized with the rotation of photosensitive member drum 6 by the function of a resist roller 13 to be delivered to copy processing portion 4, where the developer image carried on the surface of photosensitive member drum 6 is transferred to the surface of the copy paper. The copy paper with the developer image transferred thereon is heated and pressurized by fixing unit 7 so that the developer image is fused and fixed to the surface of the copy paper. The copy paper with the developer imaged fixed thereon is discharged by a paper discharge roller 11 to a paper output tray 12.

Figure 3:
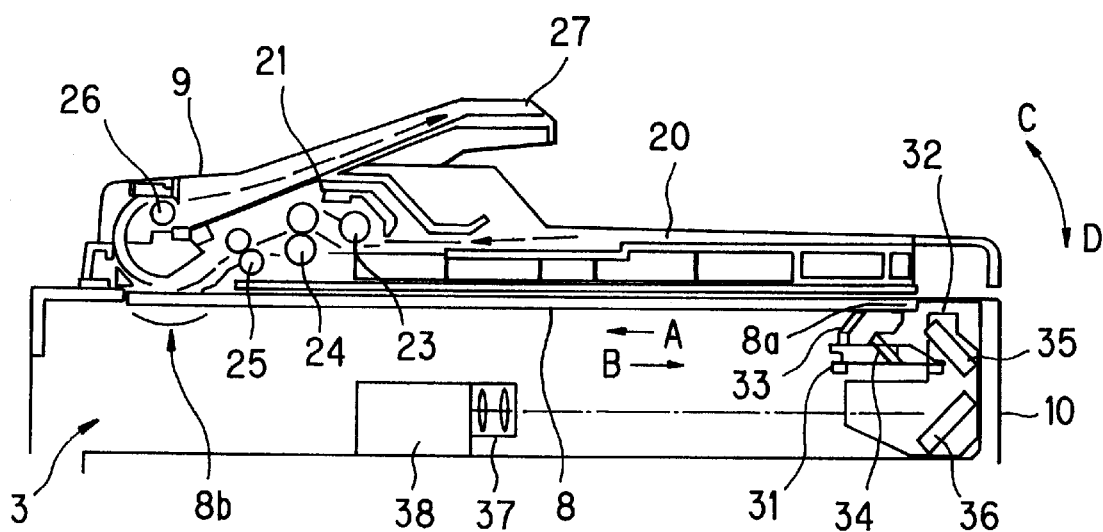
FIG. 3 is a sectional side view showing the configuration of the top part of a copier including automatic document feeder.

FIG. 3 is a sectional side view showing the configuration of the upper part of copier 10 including automatic document feeder 9. Automatic document feeder 9 mounted on the top of copier 10 comprises: a document detecting sensor 21 for detecting the presence of originals on a document stacker 20; a pickup roller 23 for delivering the originals stacked on document stacker 20, sheet by sheet, in the feeding direction; a feed roller 24 for feeding the original delivered by pickup roller 23; a resist roller 25 for delivering the fed original at a predetermined timing to reading position 8b; and a discharge roller 26 for discharging the original having passed through reading position 8b to a discharge tray 27.

Scanner unit 3 arranged in the upper interior of copier 10 includes: a first mirror base 31 having a copy lamp 33 and a mirror 34 therein; a second mirror base 32 having mirrors 35 and 36 therein and a CCD sensor 38 including a lens 37. In this scanner unit 3, first mirror base 31 and second mirror base 32 are provided so as to freely move reciprocatingly along the underside of original table 8. Copy lamp 33 illuminates the image surface of the original. Mirrors 34 to 36 direct the light from copy lamp 33 and reflected by the original image face to CCD sensor 38. Lens 37 focuses the light reflected from the original image face and directed by mirrors 34 to 36, onto the light receiving surface of CCD sensor 38. CCD sensor 38 detects the reflected light and outputs light receiving data.

Provided near the edge of original table 8 on the front side of copier 10 (on the right side in FIG. 3) is a reference position 8a to be used when the image of an original set on original table 8 is read. In this arrangement, scanner unit 3, in the manual copy mode in which the image of an original manually set on original table 8 is copied, causes first mirror base 31 to move from the position where the light from copy lamp 33 can irradiate reference position 8a of original table 8, in the direction of arrow A, to start the scan of the image face of the original.

Provided near the edge of original table 8 on the rear side of copier 10 (on the left side in FIG. 3) is a reading position 8b for reading the image of an original fed by automatic document feeder 9. In this arrangement, in the automatic copy mode in which the image of an original fed by automatic document feeder 9 is copied, scanner unit 3 keeps first mirror base 31 stationary at the position where the light from copy lamp 33 can irradiate reading position 8b of original table 8, and relatively scans the image face of the original.

Because of this configuration, automatic document feeder 9 has its essential components such as pickup roller 23 etc., concentratedly disposed on the rear side of copier 10 in order to convey originals to reading position 8b of original table 8. Therefore, the center of gravity of automatic document feeder 9 resides near the rear side of copier 10. Automatic document feeder 9 covers the top of copier 10 and is hinged at the rear side thereof so that the top of original table 8 can be opened and closed. Accordingly, automatic document feeder 9 is opened and closed at a pivot located near the rear side close to the center of gravity, with respect to the top surface of copier 10, in the direction of arrows C and D in FIG. 3. This arrangement enables markedly smooth opening and closing of automatic document feeder 9 when an original is manually set on original table 8 in the manual copy mode.

Since reference position 8a is arranged near the edge of original table 8 on the front side of copier 10 while reading position 8b is arranged near the edge of the rear side of copier 10, the stopper to be located at reference position 8a will not be an obstacle to the reading operation of the image of an original fed by automatic document feeder 9 in the automatic copy mode. Therefore, it is not necessary to provide a glass slit, which would be formed to secure a reading position 8b outside original table 8. This contributes to reduction of the number of parts and hence reduction in size and cost of the apparatus.

Figure 4:
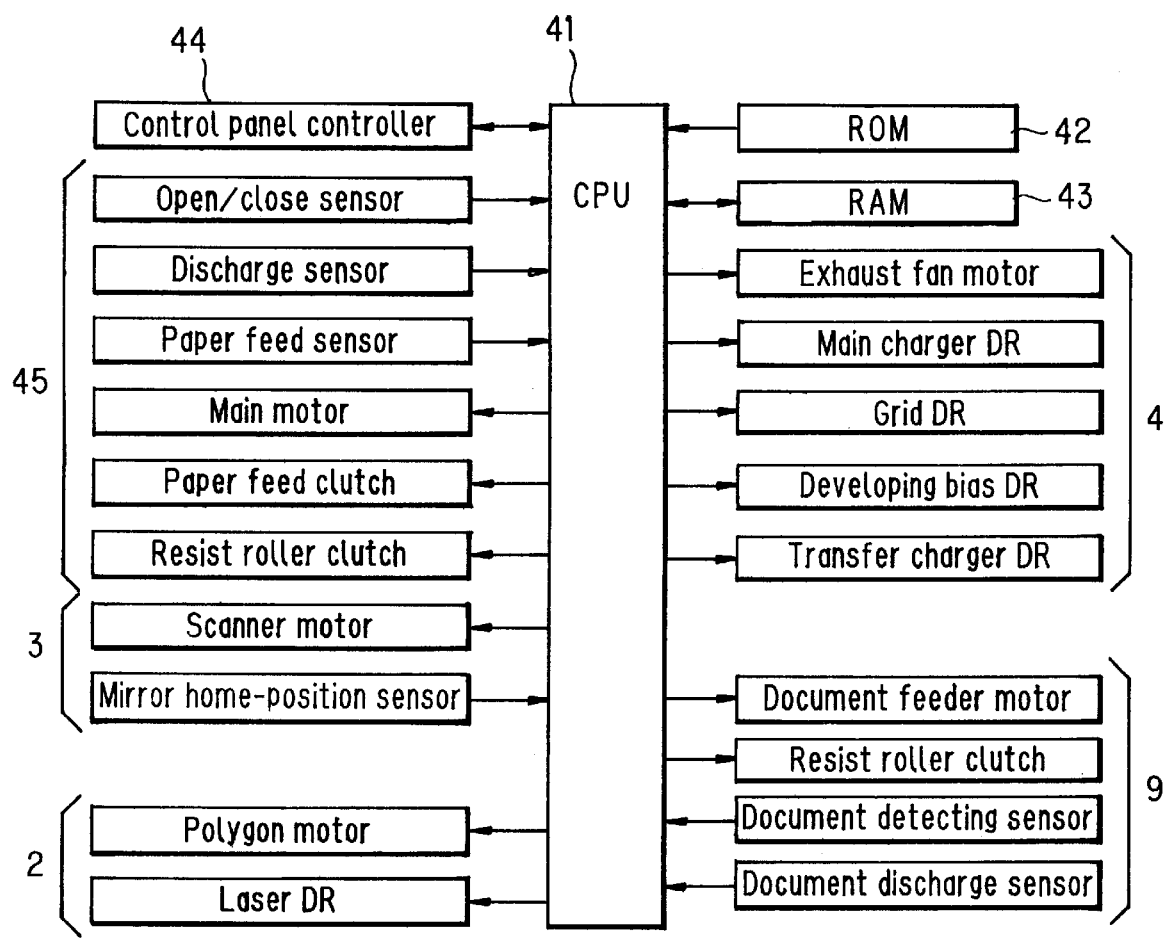
FIG. 4 is a block diagram showing the configuration of the control portion of the copier.

FIG. 4 is a block diagram showing the configuration of the control portion of the copier. The control portion of copier 10 (as shown in FIGS. 2 and 3) comprises a CPU 41 with ROM 42 and RAM 43, and input/output devices provided for copier 10 and automatic document feeder 9 which are connected to the CPU. These input/output devices include: a control panel controller 44 for controlling the display and key input operation on an unillustrated control panel disposed on the top of copier 10; a motor, clutches and sensors constituting sheet conveying portion 45 inside copier 10; a polygon motor and a laser driving circuit for laser writing unit 2, scanner motor and sensor for scanner unit 3, motors and high-voltage power circuits for copy processing portion 4; and a motor, clutch, sensors etc., provided for automatic document feeder 9.

CPU 41 totally controls the input/output devices in accordance with the algorithm which has been programmed beforehand in ROM 42. The data input to and output from CPU 41 during the control is stored in a predetermined memory area in RAM 43.

Figure 5:
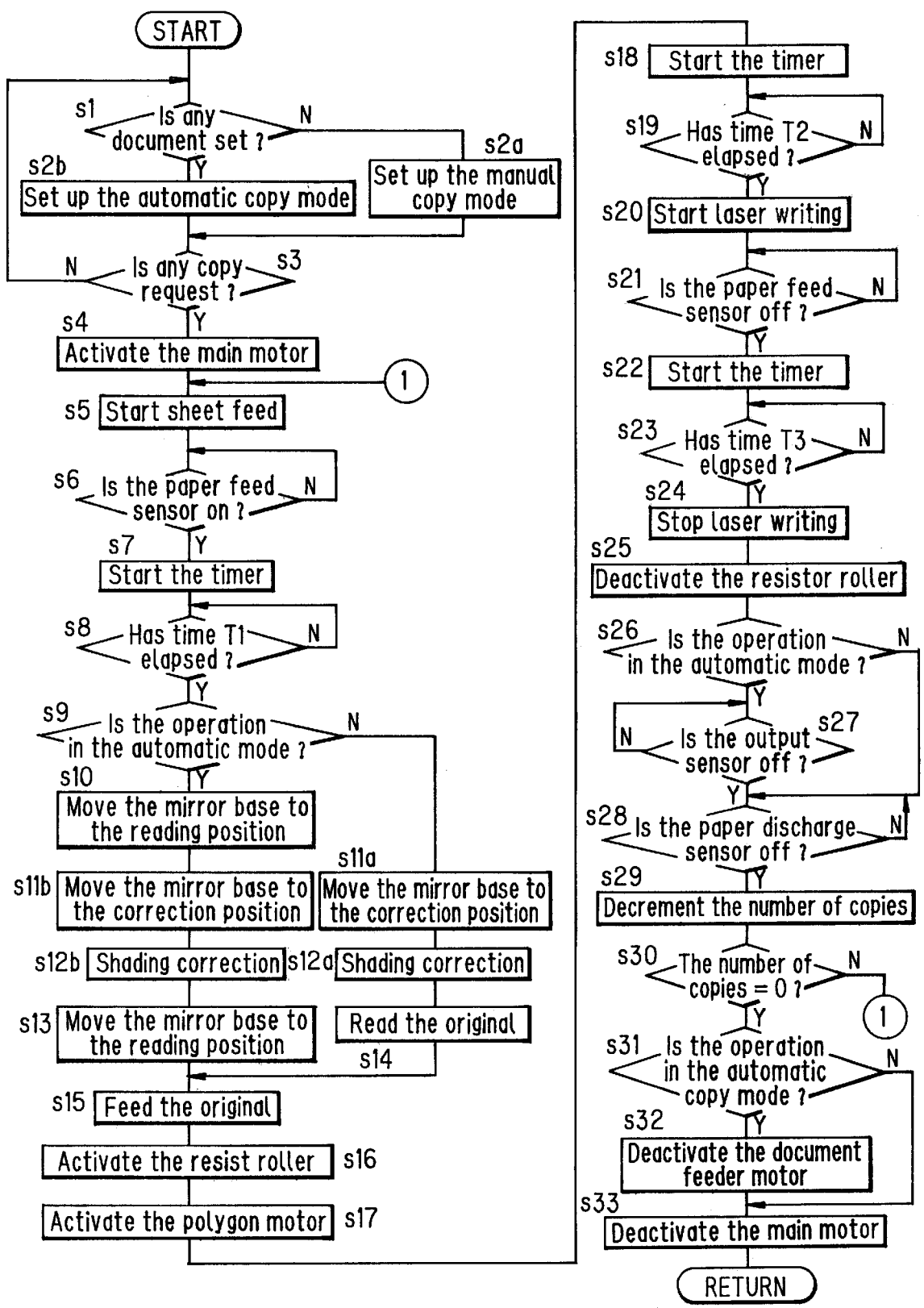
FIG. 5 is a flowchart showing the procedural steps of the control portion of the copier.

FIG. 5 is a flowchart showing the procedural steps of the control portion of the copier. CPU 41 (FIG. 4) as a constituent of the control portion of copier 10 (FIGS. 2 and 3) determines, in the ready state after the completion of initialization, whether there are any originals stacked on document stacker 20 (FIG. 3) based on the presence or absence of the signal from document detecting sensor 21 (FIG. 3) of automatic document feeder 9 (FIGS. 2 and 3) (s1). The CPU sets up the automatic copy mode (s2a) if any documents are stacked while the CPU sets up the manual copy mode (s2b) if no documents are stacked. CPU 41 then waits for a copy request through the operation of the copy switch on the control panel (s3). When a copy request is made by the operation of the copy switch, the CPU outputs a driving signal to the main motor to start the copying operation (s4).

Subsequently, CPU 41 starts a paper feeding operation by activating the paper feed clutch (s5) and then halts the paper until the set time on the timer, which is triggered by the ON-signal of the paper feed sensor located before resist roller 13 (FIG. 2) and measures the predetermined time T1, is up (s6 to s8). When the time on this timer is up, CPU determines which mode, the automatic copy mode or manual copy mode has been set up (s9).

If the manual copy mode has been set up, after shading correction (s11a and s12a) in scanner unit 3 (FIGS. 2 and 3), scanning of the image face of the original set on original table 8 is started (s14). The image data of the original thus read by CCD sensor 38 (FIG. 3) in scanner unit 3, is subjected to the predetermined image processings through the image processing circuits (s15), and then the data is supplied to the laser driving portion of laser writing unit 2 (FIG. 2).

Also, the resist roller clutch is activated so as to rotate resist roller 13, which conveys the print paper into the nip between photosensitive member drum 6 (FIG. 2) and the transfer charger (s16), and also the polygon motor in laser writing unit 2 is activated so as to be driven (s17). Then, another timer for measuring the predetermined time T2 is started so as to make the leading part of the print paper, starting to be conveyed by resist roller 13, correspond to the leading edge of the developer image formed on photosensitive member drum 6 between photosensitive member drum 6 and the transfer charger (s18). When the time on this timer is up (s19), the semiconductor laser in the laser driving portion is started to be driven based on the image data, so as to start laser writing with the laser beam emitted from laser writing unit 2 (s20).

Then, CPU 41, triggered by switching off of the unillustrated paper feed sensor located before resist roller 13 (s21), activates the timer for measuring the predetermined time T3 (s22 and s23). When the time on this timer is up, the laser writing process is finished (s24) and the resist roller 13 is stopped rotating (s25). Further, in the manual copy mode, after an unillustrated paper discharge sensor has detected the discharge of the paper to the paper output tray 12 (s26 and s28), CPU 41 judges whether the designated number of copies have been completed (s29 and s30). If the copy operation of the designated number of copies is completed, CPU 41 stops the driving of the main motor to return to the ready state (S30→S33). If the copy operation has not been completed, the next paper feed is started (s30→s5).

When the automatic copy mode has been set up upon the judgement at s9, scanner unit 3 is moved to reading position 8b (FIG. 3) on the rear side of original table 8 (FIGS. 2 and 3) (s10). After shading correction (s11b and s12b) of scanner unit 3, feeding of the original is started (s13). While the original passes through reading position 8b on original table 8, the image face of the original is read by scanner unit 3, whereby the same copy operation as in the manual copy mode is effected (s15 to s25).

Further, in the automatic copy mode, an unillustrated original discharge sensor of automatic document feeder 9 detects the discharge of the original to discharge tray 27 (FIG. 3) while the paper discharge sensor detects the discharge of the print paper to paper output tray 12 (FIG. 2) (S26 to s28). After this detection, the CPU judges whether the designated number of copies has been completed (s29 and s30). If the copy operation of the designated number of copies is completed, the CPU stops the driving of the main motor and the original feeding motor to return to the ready state (s30→s33). If the copy operation has not been completed, the next paper feed is started (s30→s5).

In the above two modes of operation, the direction of the movement (the auxiliary scan direction) of the image of an original, relative to CCD sensor 38 of scan unit 3 during image reading in the manual copy mode in which the image of an original set on original table 8 is scanned by moving mirror bases 31 and 32 (FIG. 3) from the reference position 8a (FIG. 3) near the front edge of original table 8 to the rear side, is opposite to that in the automatic copy mode in which the image of an original, whilst it is conveyed from the front side of original table 8 to the rear side by automatic document feeder 9, is scanned with first mirror base 31 set stationarily at the position opposing reading position 8b located near the rear edge of original table 8.

Further, at the image processing at s15, CCD sensor 38 as a line sensor spanning the full width across original table 8 in the left to right direction (in the main scan direction), reads all the pixel contained in one line in the main scan direction, and sequentially supplies the signals from the pixels to the image processing portion, pixel by pixel, from the leftmost pixel to the rightmost one. In the image processing portion, the image signals for all the pixels are subjected to the predetermined image processes in their input order, and the processed data is output to laser writing unit 2.

Figure 6A:
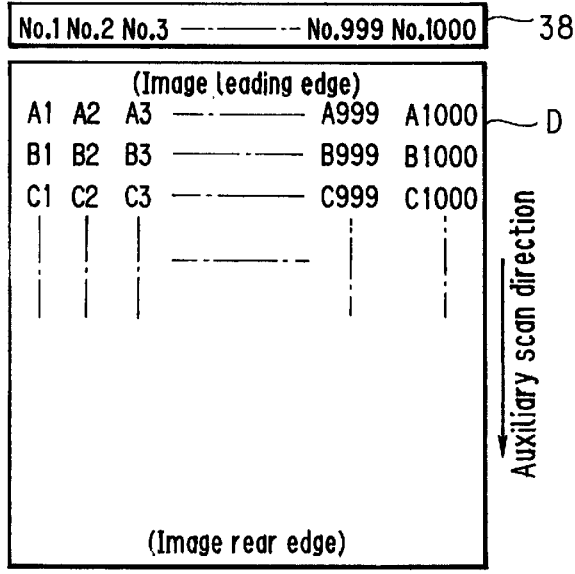
FIGS. 6A and 6B are diagrams for illustrating respective formation states of the copy image in the manual copy mode and in the automatic copy mode in the copier.
Figure 6A:
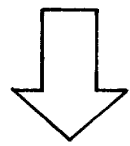
Figure 6A:
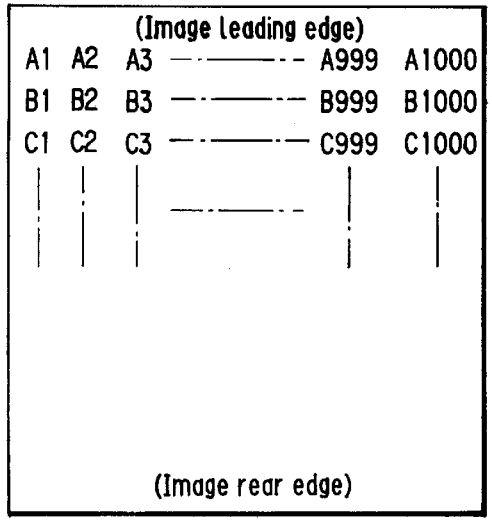
Figure 6B:
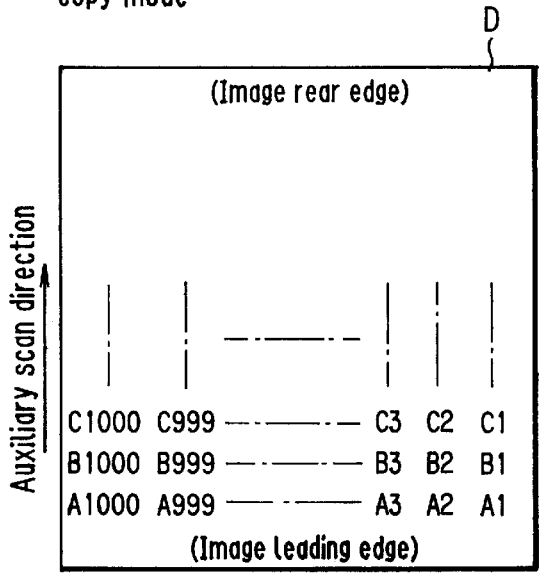
Figure 6B:
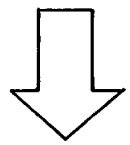
Figure 6B:
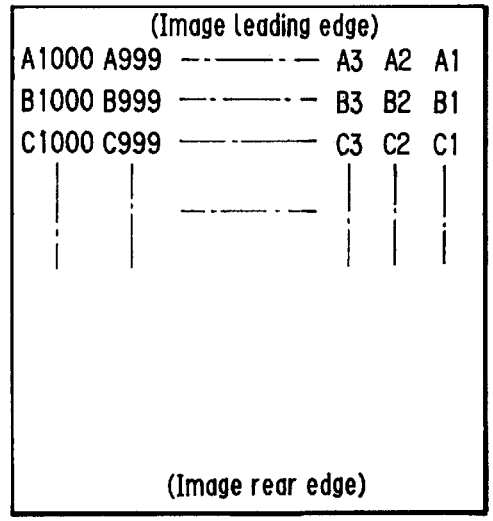

From these facts, when an original is set on original table 8 with the leading edge of the image laid on reference position 8a in the manual copy mode, the image data is output from CCD sensor 38, sequentially from the leftmost pixel of the original image. In contrast, when an original is set on automatic document feeder 9 so that the leading edge of the image is fed first into reading position 8b in the automatic copy mode, the image data is output from CCD sensor 38, sequentially from the rightmost pixel of the original image. Illustratively, as shown in FIGS. 6A and 6B, the image data is output in the order of A1, A2, . . . , A1000 in the manual copy mode, whereas the image data is output in the order of A1000, A999, . . . , A1 in the automatic copy mode. Thus, the copied image of the original in the manual copy mode will be reproduced with right and left reversed in the automatic copy mode.

To deal with this, memory capable of at least storing one line of pixels in the main scan direction, of the image signal supplied from CCD sensor 38 (FIG. 3) during image processing in the automatic copy mode or storing the image data after image processing is provided for the image processing portion, so that the image data after image processing, is output to laser writing unit 2 (FIG. 2) from the image processing portion, in the inverse order to that in which the data was stored into the memory. Thus, it is possible to make the copy image in the automatic copy mode correspond to the copy image in the manual copy mode.

If, for example, the image data from one line of pixels in the main scan direction, namely A1000, A999, . . . , A1, are stored in this sequential order into the memory at addresses $\alpha$ to $\alpha+999$ as shown in FIG. 7, the image data is read out from addresses $\alpha+999$, $\alpha+998$, . . . , $\alpha$, in this sequential order to be supplied to laser writing unit 2 (FIG. 2). This situation is also the same as in the case where the image data from multiple lines of pixels in the main scan direction is stored into the memory.

Alternatively, as shown in FIG. 8, scanner unit 3 (FIGS. 2 and 3) may be provided with two CCD sensors, namely, a first CCD sensor for capturing each line of pixels, in the manual copy mode, in the main scan direction 38a from the leftmost pixel to the rightmost one, and supplying the image data, pixel by pixel, to the image processing portion, and a second CCD sensor for capturing each line of pixels, in the automatic copy mode, in the main scan direction 38b from the rightmost pixel to the leftmost one, and supplying the image data, pixel by pixel, to the image processing portion. This configuration enables the copy image in the manual copy mode to correspond to that in the automatic copy mode, without the necessity of providing any memory for storing the image data in the automatic copy mode.

Figure 9A:
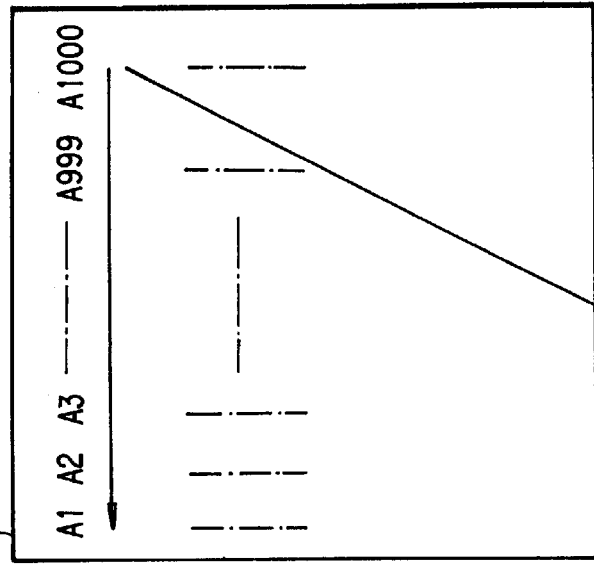
FIGS. 9A and 9B are illustrations for explaining the operation of the laser writing unit of a copier having an automatic document feeder in accordance with the third embodiment, related to the second aspect of the invention.
Figure 9A:
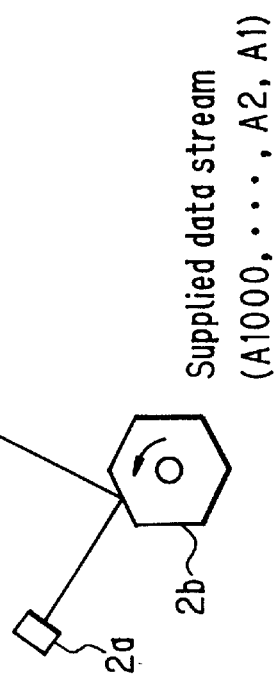
Figure 9B:
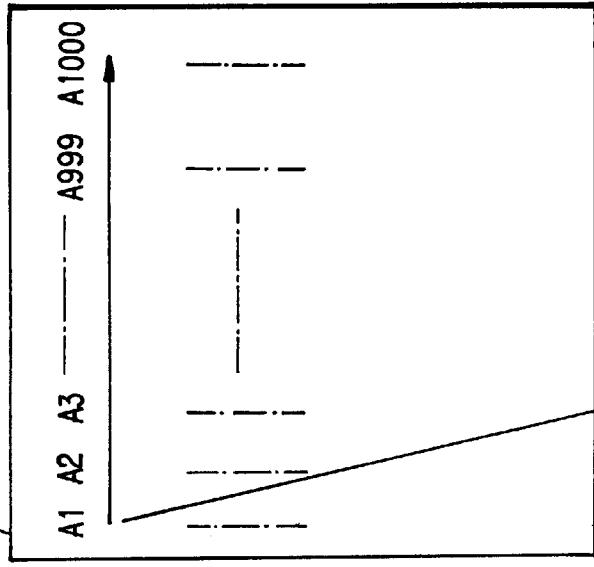
Figure 9B:
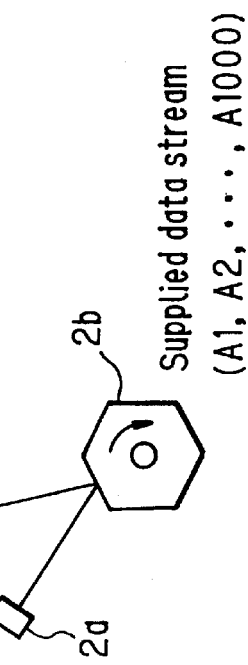

Further, as shown in FIGS. 9A and 9B, the rotational direction of a polygon mirror 2b for deflecting the beam of image from a semiconductor laser 2a in laser writing unit 2 (FIG. 2) to scan in the main scan direction and irradiate the photosensitive member drum 6 (FIG. 2) with the beam of image may be reversed between the manual copy mode (FIG. 9A) and automatic copy mode (FIG. 9B). This configuration also enables the orientation of the copy image in the manual copy mode to correspond to that in the automatic copy mode, without the necessity of providing any memory for storing the image data in the automatic copy mode.

Figure 10:
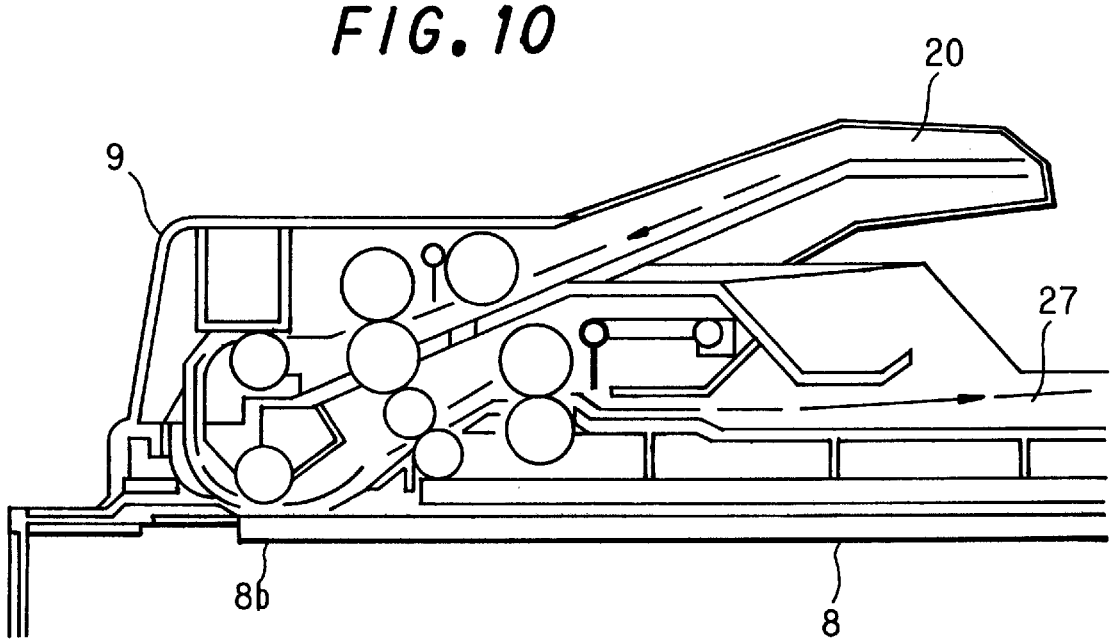
FIG. 10 is a sectional side view showing the configuration of the essential components of a copier having an automatic document feeder in accordance with the embodiment, related to the third aspect of the invention.

Further, document stacker 20 and document discharge tray 27 in automatic document feeder 9 shown in FIG. 3 may have their positions changed, from one to the other, as shown in FIG. 10, so that the feed direction of the original relative to the reading position 8b of original table 8 may be inverted with respect to that in the configuration shown in FIG. 3. Thus, the movement (the auxiliary scan direction) of the image of the original relative to CCD sensor 38 (FIG. 3) of scan unit 3 (FIGS. 2 and 3) in the manual copy mode can be made to agree with that in the automatic copy mode, to thereby enable the orientation of the copy image in the manual copy mode to correspond to that in the automatic copy mode, without the necessity of providing any memory for storing the image data in the automatic copy mode.

In copier 10 having automatic document feeder 9 according to the above embodiment (FIGS. 2 and 3), mirror bases 31 and 32 (FIG. 3) are set at their home positions near the front edge of original table 8 while first mirror base 31 in the automatic copy mode opposes to reading position 8b set near the rear edge of original table 8. In this configuration, if first mirror base 31 is moved from its home position to the position opposing reading position 8b after a copy request through the copy key in the automatic copy mode, it takes long time before starting the copy operation, which lowers the operational efficiency of the copier.

Figure 11:
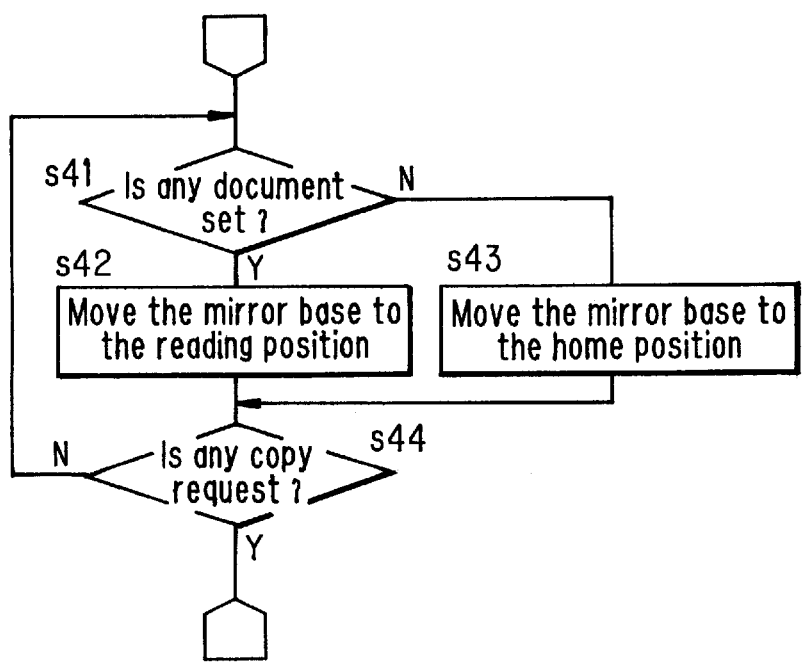
FIG. 11 is a flowchart showing part of the steps of the process of the control portion of a copier having an automatic document feeder in accordance with another embodiment of the invention.

To avoid this, as shown in FIG. 11, in the ready state in which a copy request through the operation of the copy key is waited for (s44), it is judged whether any original documents are set on document stacker 20 (FIGS. 3 and 10) of automatic document feeder 9 (FIGS. 2, 3 and 10) (s41). If any documents are set on document stacker 20 of automatic document feeder 9, mirror bases 31 and 32(FIG. 3) move until first mirror base 31 reaches the position opposing reading position 8b (FIGS. 3 and 10) (s42). If no document is set on document stacker 20 of automatic document feeder 9, mirrors 31 and 32 move to their home positions (s43).

By this operation, when the originals are set on document stacker 20 of automatic document feeder 9, mirror bases 31 and 32 are moved until first mirror base 31 reaches the position opposing reading position 8b, so as to enable starting the copy operation as soon as a copy request is made, thus making it possible to reduce the time required for the copy operation and hence improve the operational efficiency of the copier.

In copier 10 having automatic document feeder 9 according to the above embodiment (FIGS. 2, 3 and 10), shading correction (image correction process) of scan unit 3 (FIGS. 2 and 3) is executed before reading the image of an original at step s12a and s12b shown in FIG. 5. In the shading correction, the driving voltage of copy lamp 33 (FIG. 3) is corrected so that the output signal from CCD sensor 38 (FIG. 3) when reading the reference density image will meet the reference value. For this purpose, a white plate (correction member) as the reference density image to be read by scanner unit 3 upon shading correction is attached to a position opposing first mirror base 31 residing near its home position, on the interior side of the top of copier body 10.

This shading correction is effected not only in the manual copy mode in which reading of the original image is started from reference position 8a set near the front edge of original table 8 but also in the automatic copy mode in which reading of the original image is effected at reading position 8b set near the rear edge of original table 8. Therefore, if shading correction in the automatic copy mode is effected using the white plate attached to the position corresponding to the home position, first mirror base 31 needs to be moved after the completion of shading correction from the position where the white plate is attached near the front edge of original table 8 to reading position 8b near the rear edge of original table 8b, which lengthens the time required for the copying operation and hence lowers the operational efficiency of the copier.

Figure 12:
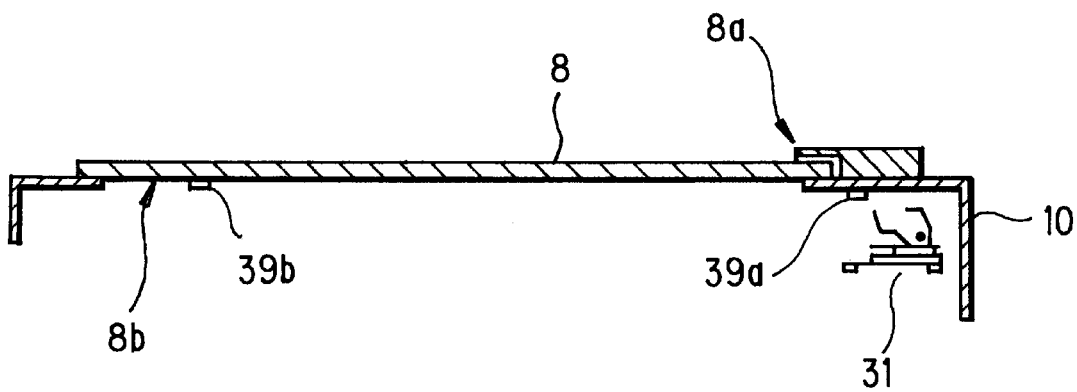
FIG. 12 is a sectional side view showing the configuration of the essential parts of a copier having an automatic document feeder in accordance with the first embodiment related to the fourth aspect of the invention.

To avoid this, in a copier 10 shown in FIG. 12, while a front-side white plate 39a is provided near the reference position 8a of original table 8 for shading correction in the manual copy mode, a rear-side white plate 39b is provided near reading position 8b on the undersurface of original table 8 for shading correction in the automatic copy mode, to thereby reduce the distance of first mirror base 31 moving after the completion of shading correction in the automatic copy mode.

Figure 13:
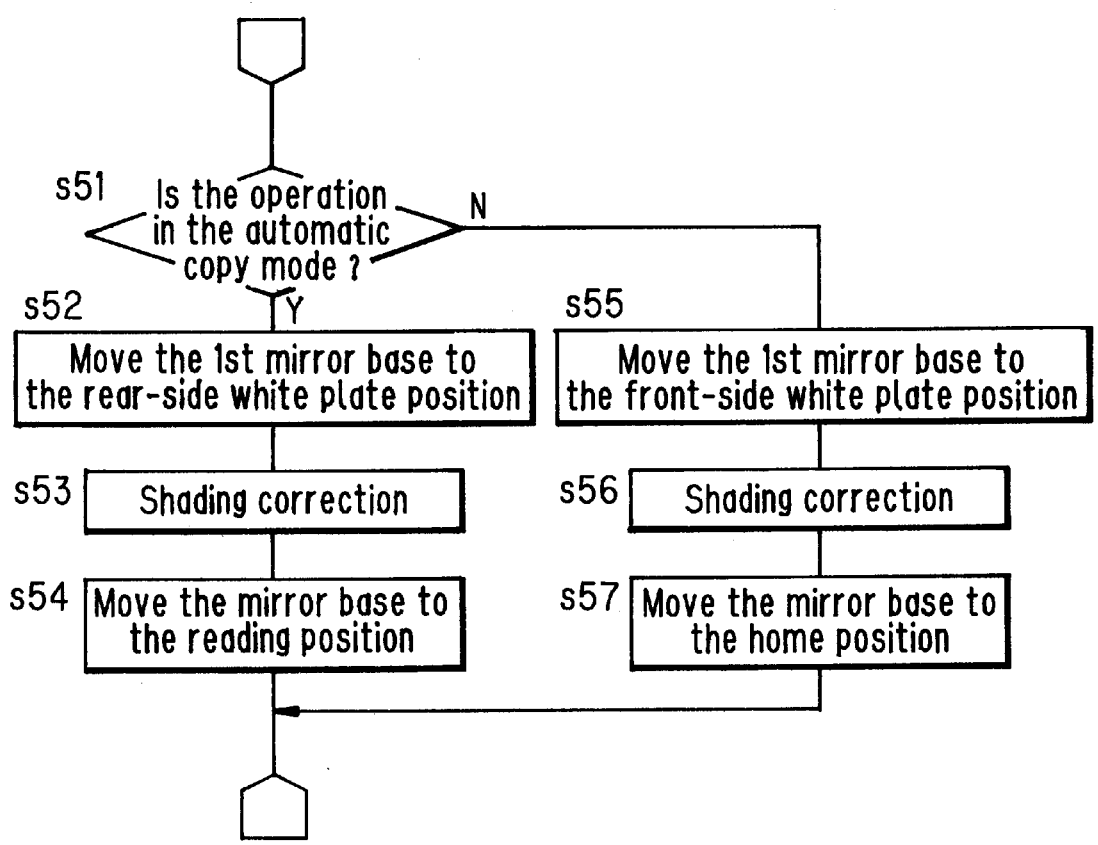
FIG. 13 is a flowchart showing part of the steps of the process of a copier having an automatic document feeder in accordance with the second embodiment related to the fourth aspect of the invention.

Referring next to the flowchart shown in FIG. 13, the operation relating to FIG. 12 will be described. Upon the start of shading correction, first, it is judged which mode, either the manual copy mode or the automatic copy mode, is selected (s51). When the automatic copy mode is selected, first mirror base 31 is moved to the position opposing rear-side white plate 39b (s52) so as to implement the predetermined shading correction using rear-side white plate 39b (s53). Then, first mirror base 31 is moved to the position opposing reading position 8b (s54). When the manual copy mode is selected, first mirror base 31 is moved to the position opposing front-side white plate 39a (s55) so as to implement the predetermined shading correction using front-side white plate 39a (s56). Thereafter, first mirror base 31 is moved to the home position (s57).

By the above operation, it is possible to effect shading correction in either the manual copy mode or the automatic copy mode, using front-side white plate 39a or rear-side white plate 39b, each provided near the respective position from where reading of the original image is started. Thus, it is possible to reduce the distance that first mirror base 31 needs to be moved after the end of shading correction and hence improve the operational efficiency of copier 10.

The procedures from s51 to s57 may either be effected after a copy request through the copy key, or in the ready state before a copy request.

Figure 14:
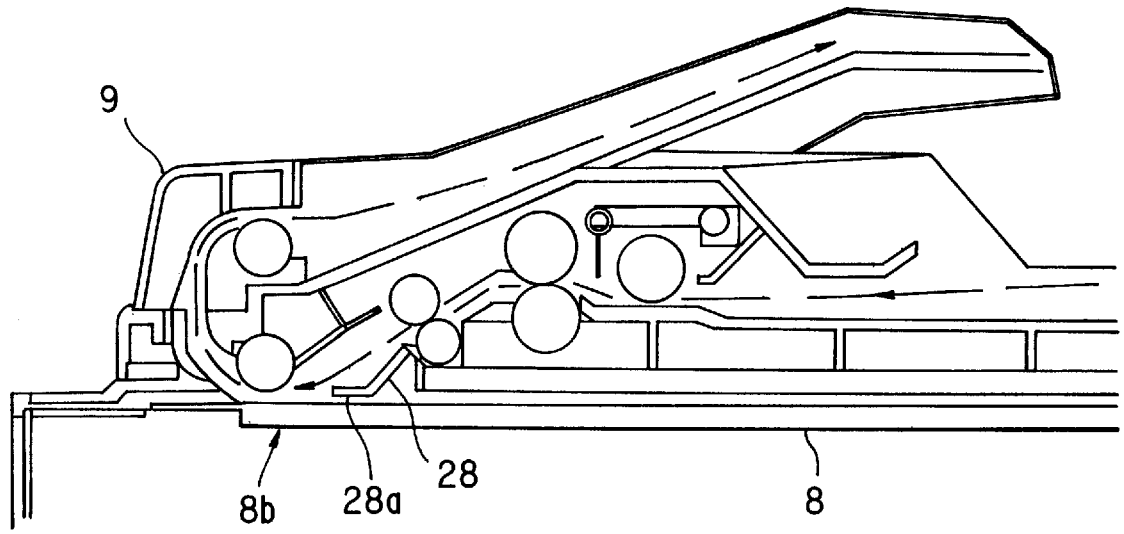
FIG. 14 is a sectional side view showing the configuration of the essential parts of a copier having an automatic document feeder in accordance with the third embodiment related to the fourth aspect of the invention.

As shown in FIG. 14, a white plate portion 28a may be formed as a part of a guide member 28 which is provided for automatic document feeder 9, above and in proximity to reading position 8b of original table 8 for guiding originals to the feeding direction so as to effect shading correction using this white plate portion 28a in the automatic copy mode.

Figure 15:
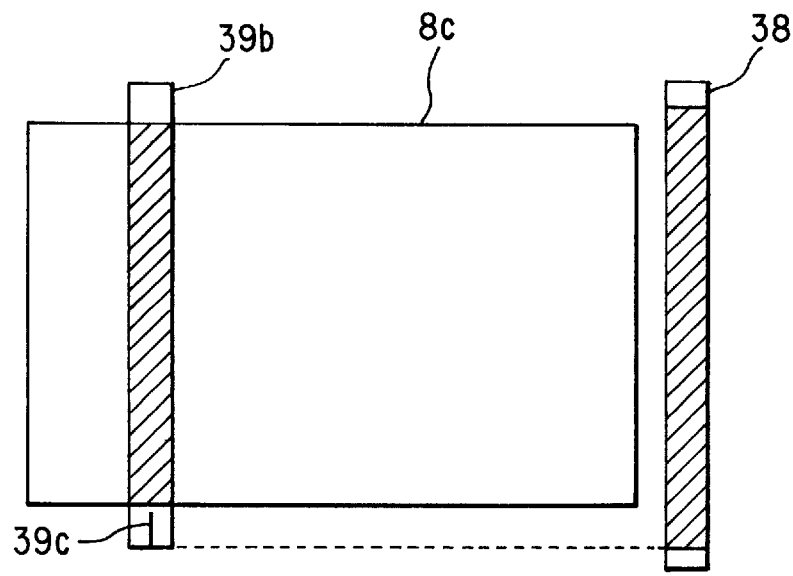
FIG. 15 is a diagram for explaining the operation of a copier having an automatic document feeder in accordance with the fourth embodiment related to the fourth aspect of the invention.

Alternatively, if CCD sensor 38 has an effective image reading area having a width greater than the that of image area 8c as shown in FIG. 15, a black line 39c representing the mid position of the movement (in the auxiliary scan direction) of mirror bases 31 and 32 (FIGS. 3 and 12) may be displayed within the effective image reading area of CCD sensor 38 and outside image area 8c. With this configuration, the position where CCD sensor 38 reads black line 39c may be used as the position for shading correction in the automatic copy mode so as to control the movement in the auxiliary scan direction of mirror bases 31 and 32.

Figure 16:
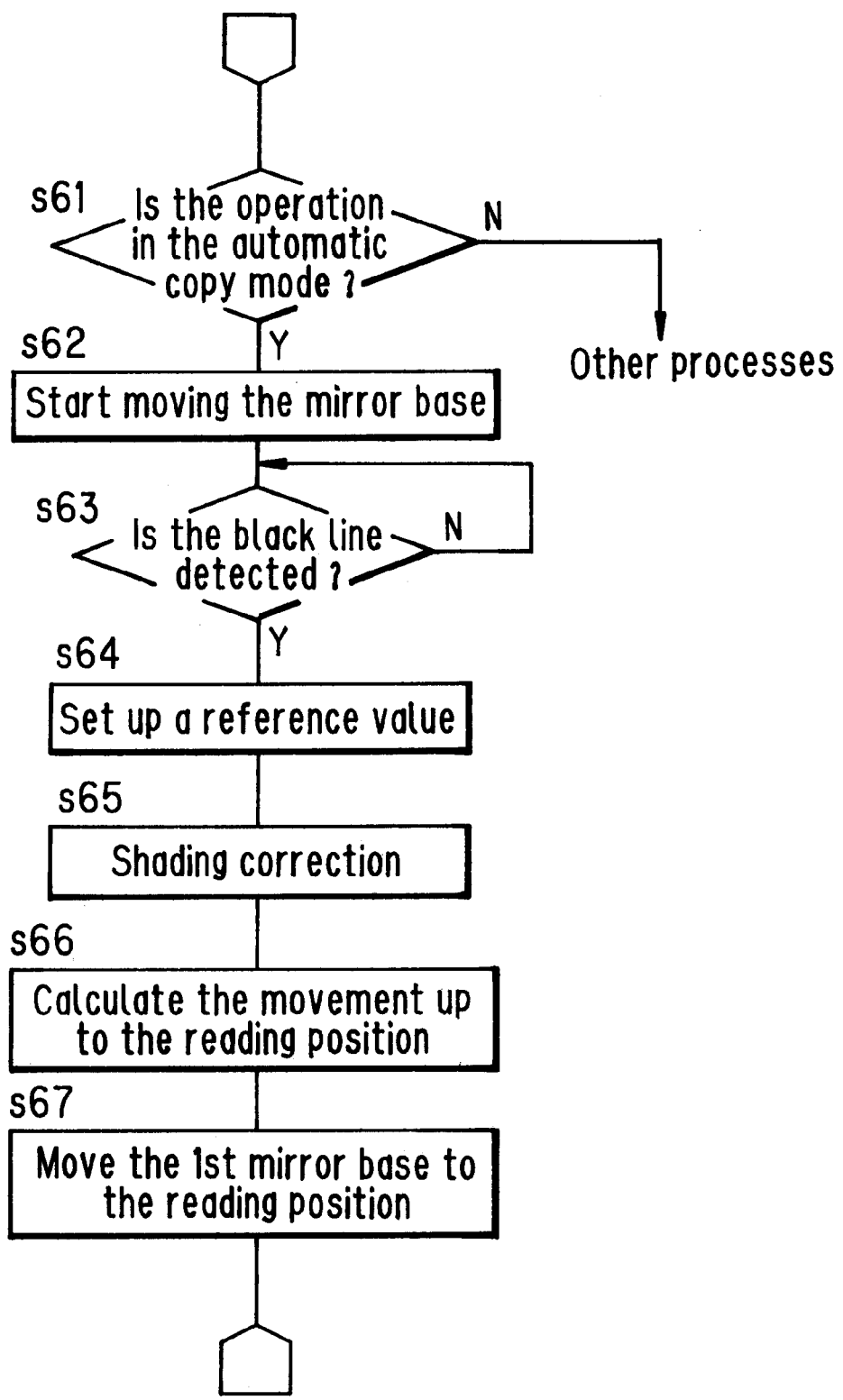
FIG. 16 is a flowchart showing part of the steps of the process of the control portion of a copier having an automatic document feeder in accordance with the same embodiment.

Referring next to the flowchart shown in FIG. 16, the operation relating to FIG. 15 will be described. Upon the start of shading correction, first, it is judged which mode, either the manual copy mode or the automatic copy mode, is selected (s61). When the automatic copy mode is selected, mirror bases 31 and 32 (FIGS. 3 and 12) are moved from their home positions to the rear side of copier 10 until CCD sensor 38 detects black line 39c (FIGS. 3 and 12) (s62 and s63). Upon this, the distance of the movement is memorized as the measurement (s64) while the predetermined shading correction is implemented using rear-side white plate 39b (s65). Then, based on the preset value as the distance from the home position to reading position 8b and the measurement from the home position to black line 39c, the distance that first mirror base 31 needs to be moved to be opposed to reading position 8b is calculated (s66), and first mirror base 31 is moved by the distance thus calculated (s67).

This operation provides for exact movement of mirror bases 31 and 32 to the positions for shading correction and reading position 8b even if the distance that mirror bases 31 and 32 to be moved for shading correction has varied due to some error or if the attachment of rear-side white plate 39b has produced a positional error.

The procedures from s61 to s67 may either be effected after a copy request through the copy key, or in the ready state before a copy request.

Figure 17:
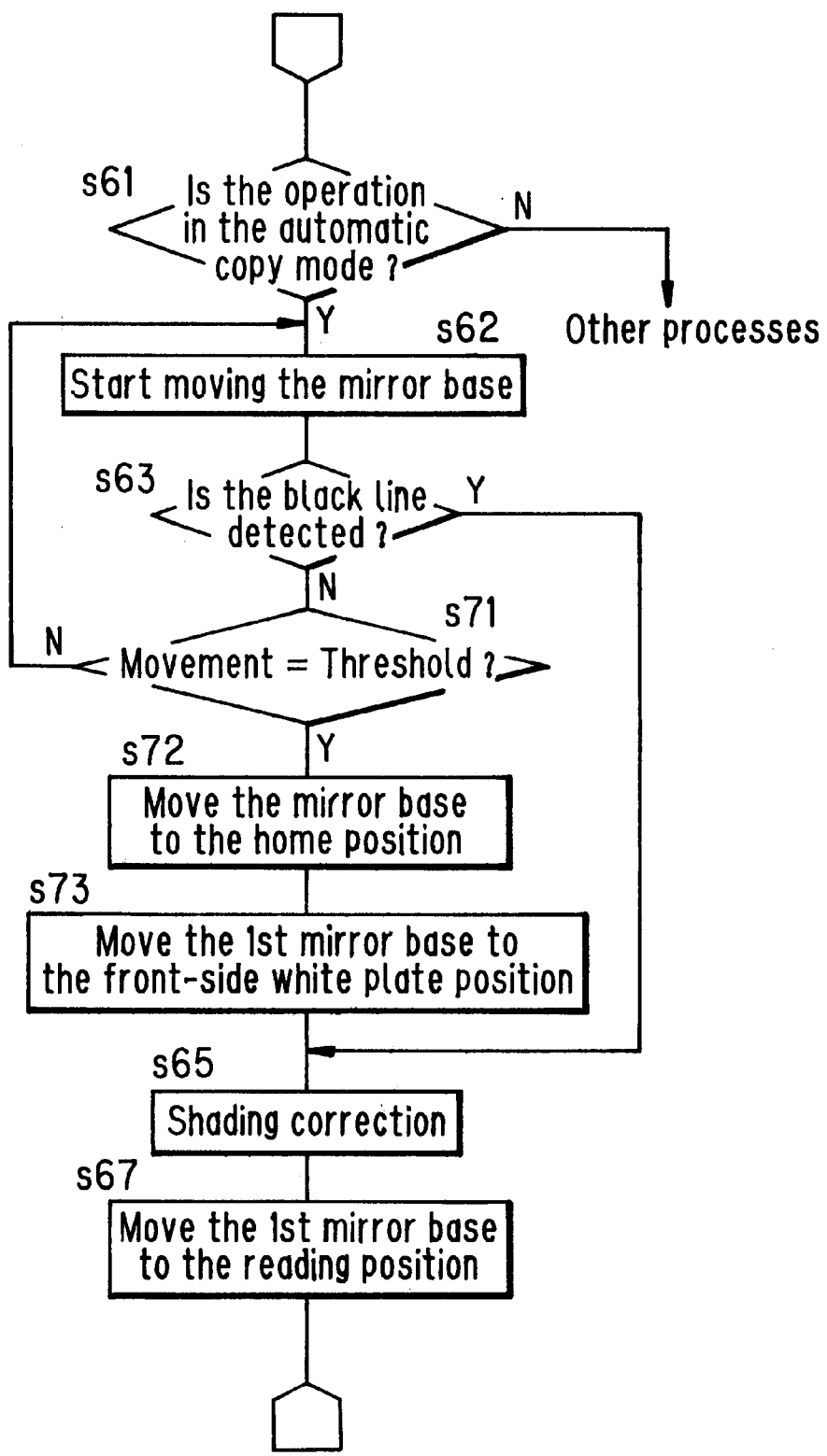
FIG. 17 is a flowchart showing part of the steps of another process of the control portion of a copier having an automatic document feeder in accordance with the same embodiment.

Also, as shown in FIG. 17, in the automatic copy mode (s61), during the movement of mirror bases 31 and 32 (FIG. 3) for shading correction at s62 and s63 described with reference to FIG. 16, if black line 39c (FIG. 15) could not be detected even when mirror bases 31 and 32 have moved beyond the respective preset threshold distances, mirror bases 31 and 32 may be carried back to their home positions (s71 and s72), so that first mirror base 31 can be moved to the position for shading correction, opposing front-side white plate 39a (FIG. 12) for the manual copy mode (s73). Then, after effecting shading correction at that position (s65), first mirror base 31 may be moved to reading position 8b (FIGS. 3, 10, 12 and 14) (s67).

Thus, if black line 39c could not be detected by CCD sensor 38 (FIG. 3), shading correction for the automatic copy mode can be implemented by using front-side white plate 39a for shading correction in the manual copy mode, whereby it is possible to prevent shading correction errors from arising in the automatic copy mode and hence maintain good quality copy images.

Further, during the movement of mirror bases 31 and 32 for shading correction at s62 and s63, if black line 39c could not be detected even when mirror bases 31 and 32 have moved beyond the respective preset threshold distances, the operation of the automatic copy mode may be stopped while a message indicating that anomaly with rear-side white plate 39b is occurring and a message that promotes the operator to perform a copy operation in the manual copy mode may be displayed on the display in the control panel.

Figure 18:
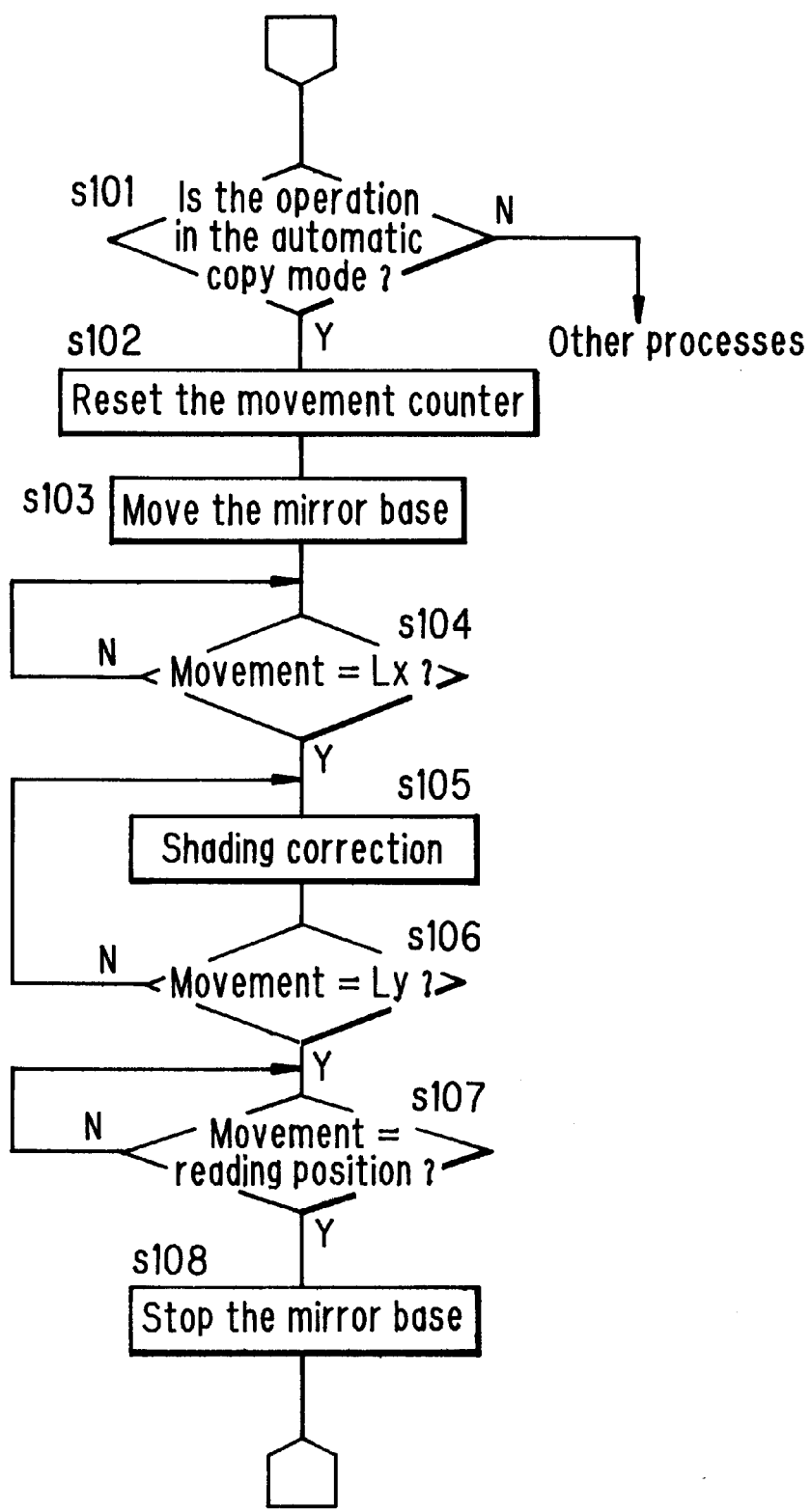
FIG. 18 is a flowchart showing part of the steps of the process of the control portion of a copier having an automatic document feeder in accordance with the embodiment related to the fifth aspect of the invention.

Also, it is also possible to provide a configuration as shown in FIG. 18. That is, after a copy request by the control of the copy key, it is judged which mode, either the manual copy mode or the automatic copy mode, is selected (s101). When the automatic copy mode is selected, a counter for measuring the movement of first mirror base 31 (FIGS. 3 and 12) is reset (s102) and mirror bases 31 and 32 are started to move from home position to the rear side of copier 10 (FIGS. 2, 3 and 12) (s103). As the mirror bases move, shading correction is performed from a first point of time when the movement measured by the counter corresponds to the predetermined movement Lx to a second point of time when the movement corresponds to the predetermined movement Ly (s104 to s106). Then, when the movement measured by the counter corresponds to the movement for first mirror base 31 to oppose reading position 8*b*, mirror bases 31 and 32 are stopped moving (s107 and s108) so as to start a copy operation.

By this operation, shading correction can be performed whilst mirror bases 31 and 32 are moving in preparation for a copying operation in the automatic copy mode, thus making it possible to reduce the time required for the copying operation including shading correction and thereby improve the operational efficiency of the copier. Further, if multiple shading corrections are performed whilst first mirror base 31 moves from the point of movement Lx to the point of movement Ly, it is possible to prevent shading correction error from arising due to partial pollution of rear-side white plate 39*b* (FIGS. 12 and 15).

In accordance with the first aspect of the invention, the reading position where the essential parts in the automatic document feeder are arranged concentratedly is laid out near the rear edge of the original table while the automatic document feeder is mounted at a hinge near the rear edge so as to cover the top surface of the original table in an openable and closable manner. This configuration allows for smooth opening and closing of the automatic document feeder about the hinge on the rear side which is in proximity to the center of gravity thereof. Further, the reference position to which the set original is positioned is disposed near the front edge of the original table while the reading position for reading the image of the original in the automatic copy mode is disposed near the rear edge of the original table. Therefore, since the member for providing the reference position will not interfere with reading of the original image even when the reading position is provided within the original table, it is no longer necessary to separately provide any glass slit or the like for providing a reading position. Thus, it is possible to reduce the number of parts and hence realize reduction of the apparatus in size and cost.

In accordance with the second aspect of the invention, since the copy image obtained in the automatic copy mode and that in the manual copy mode are made to agree with each other, the copy image in one of the manual and automatic copy modes will not be reproduced as a reversal of the image in the other mode. Accordingly, it is possible to provide a pertinent copy image at any mode.

In accordance with the third aspect of the invention, the movement of the image of the original relative to the scanner portion in the manual copy mode in which the scanner portion moves relative to the original set on the original table is made agree with that in the automatic copy mode in which the original is moved relative to the scanner portion which is set stationarily at the reading position. Thus, the image data captured by the scanner portion in one of the manual and automatic copy modes can be made to agree with that in the other mode without needing inversion of the read image data. This configuration makes it possible to provide a pertinent copy image at any mode.

In accordance with the fourth aspect of the invention, in the manual copy mode in which the scanner portion starts to move from the proximity to the front edge of the original table, the front-side correction member provided near the front edge of the original table is used to perform image correction while in the automatic copy mode in which the scanner portion is set stationarily in the proximity to the rear edge of the original table, the rear-side correction member provided near the rear edge of the original table is used to perform image correction. This configuration can shorten the moving distance of the scanner portion during a copy operation including image correction and hence can reduce the time required for a copy operation and improve the operational efficiency of the copier.

In accordance with the fifth aspect of the invention, upon the start of a copy operation in the automatic copy mode, image correction is performed using the rear-side correction member during preparation of the automatic copy mode, in which the scanner portion moves from the home position disposed near the front edge of the original table to the reading position disposed near the rear edge of the original table. Therefore, image correction to be done before the start of the copying operation can be performed during movement of the scanner portion, thus making it possible to reduce the time required for the copying operation and hence improve the operational efficiency of the copier.

What is claimed is:

1. A copier with an automatic document feeder, comprising:

an original table;

an automatic document feeder hinged at the rear side of the original table so as to cover the top surface of the original table in an openable and closable manner; and a scanner portion which, in the manual copy mode in which the image of an original manually set on the original table is copied, is set at a reference position from which the scanner portion starts moving, near the front edge of the original table, and is set stationarily at a reading position near the rear edge of the original table in the automatic copy mode in which the image of an original fed by the automatic document feeder is copied.

2. The copier with an automatic document feeder according to claim 1, further comprising a copy image normalizing means which makes the copy image in the manual copy mode correspond to the copy image in the automatic copy mode.

3. The copier with an automatic document feeder according to claim 2, wherein the copy image normalizing means is configured so that the direction of the relative movement of the original image face to the scanner portion in the manual copy mode is made correspondent to the direction of the relative movement of the original image face to the scanner portion in the automatic copy mode.

4. The copier with an automatic document feeder according to claim 1, further comprising:

a front-side correction member used for an image correcting process in the manual copy mode, disposed near the front edge of the original table; and a rear-side correction member used for an image correcting process in the automatic copy mode, disposed near the rear edge of the original table.

5. The copier with an automatic document feeder according to claim 4, wherein the image correcting process is performed using the rear-side correction member during preparation of the automatic copy mode, in which the scanner portion moves from a home position disposed near the front edge of the original table to the reading position disposed near the rear edge of the original table.

* * * * *